United States Patent
Peng et al.

(10) Patent No.: US 10,816,726 B1
(45) Date of Patent: Oct. 27, 2020

(54) EDGE COUPLERS FOR PHOTONICS APPLICATIONS

(71) Applicant: GLOBALFOUNDRIES Inc., Grand Cayman (KY)

(72) Inventors: Bo Peng, Wappingers Falls, NY (US); Yusheng Bian, Ballston Lake, NY (US); Ajey Poovannummoottil Jacob, Watervliet, NY (US); Thomas Houghton, Marlboro, NY (US); Asli Sahin, Danbury, CT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/549,415

(22) Filed: Aug. 23, 2019

(51) Int. Cl.
G02B 6/34 (2006.01)
G02B 6/122 (2006.01)
G02B 6/38 (2006.01)
G02B 6/36 (2006.01)
G02B 6/30 (2006.01)

(52) U.S. Cl.
CPC .......... *G02B 6/1228* (2013.01); *G02B 6/305* (2013.01); *G02B 6/3636* (2013.01); *G02B 6/3885* (2013.01)

(58) Field of Classification Search
CPC ........ G02B 6/34; G02B 6/305; G02B 6/1228; G02B 6/3636; G02B 6/3885
See application file for complete search history.

(56) References Cited

U.S. PATENT DOCUMENTS

| 9,529,150 | B2 * | 12/2016 | Orcutt | G02B 6/12004 |
| 9,620,931 | B2 * | 4/2017 | Tanaka | H01S 5/125 |
| 10,126,500 | B2 | 11/2018 | Qi et al. | |
| 10,197,731 | B2 | 2/2019 | Teng et al. | |
| 2017/0017034 | A1 | 1/2017 | Painchaud et al. | |

OTHER PUBLICATIONS

Cheben et al., "Refractive index engineering with subwavelength gratings for efficient microphotonic couplers and planar waveguide multiplexers" Optics Letters vol. 35, Issue 15, pp. 2526-2528 (2010).
Cheben et al., "Subwavelength waveguide grating for mode conversion and light coupling in integrated optics" Optics Express vol. 14, Issue 11, pp. 4695-4702 (2006).
M. Teng et al., "Trident Shape SOI Metamaterial Fiber-to-Chip Edge Coupler," 2019 Optical Fiber Communications Conference and Exhibition (OFC), San Diego, CA, USA, 2019, pp. 1-3.

(Continued)

*Primary Examiner* — Jennifer Doan
(74) *Attorney, Agent, or Firm* — Thompson Hine LLP; Francois Pagette

(57) ABSTRACT

Structures for an edge coupler and methods of fabricating a structure for an edge coupler. A waveguide core and a coupler are formed over a layer stack that includes a first dielectric layer and a second dielectric layer over the first dielectric layer. The coupler includes a first plurality of grating structures and a transition structure including a second plurality of grating structures that are positioned between the first plurality of grating structures and the waveguide core. The first plurality of grating structures include respective widths that vary as a function of position relative to the transition structure.

20 Claims, 4 Drawing Sheets

(56) References Cited

OTHER PUBLICATIONS

Cheben, et al., "Broadband polarization independent nanophotonic coupler for silicon waveguides with ultra-high efficiency," Opt. Express 23, 22553-22563 (2015).

Papes et al., "Fiber-chip edge coupler with large mode size for silicon photonic wire waveguides," Opt. Express 24, 5026-5038 (2016).

Barwicz, et al., "An O-band Metamaterial Converter Interfacing Standard Optical Fibers to Silicon Nanophotonic Waveguides," in Optical Fiber Communication Conference, OSA Technical Digest (online) (Optical Society of America, 2015), paper Th3F.3.

Shang, et al., "Silicon nitride tri-layer vertical Y-junction and 3D couplers with arbitrary splitting ratio for photonic integrated circuits," Opt. Express 25, 10474-10483 (2017).

* cited by examiner

US 10,816,726 B1

EDGE COUPLERS FOR PHOTONICS APPLICATIONS

BACKGROUND

The present invention relates to photonics chips and, more specifically, to structures for an edge coupler and methods of fabricating a structure for an edge coupler.

Photonics chips are used in many applications and systems including, but not limited to, data communication systems and data computation systems. A photonics chip integrates optical components, such as waveguide cores and bends, and electronic components, such as field-effect transistors, into a unified platform. Among other factors, layout area, cost, and operational overhead may be reduced by the integration of both types of components into the unified platform.

Edge couplers are commonly used in photonics chips for coupling optical signals between optical fibers and waveguide cores. In general, an edge coupler is arranged adjacent to a groove in which an optical fiber is placed. Optical signals from the much larger core of the optical fiber are transferred by the edge coupler to the considerably smaller waveguide core on the photonics chip.

Improved structures for an edge coupler and methods of fabricating a structure for an edge coupler are needed.

SUMMARY

In an embodiment of the invention, a structure includes a layer stack having a first dielectric layer and a second dielectric layer over the first dielectric layer, a waveguide core over the layer stack, and a coupler over the layer stack. The coupler includes a first plurality of grating structures and a transition structure including a second plurality of grating structures that are positioned between the first plurality of grating structures and the waveguide core. The first plurality of grating structures include respective widths that vary as a function of position relative to the transition structure.

In an embodiment of the invention, a method includes forming a layer stack that has a first dielectric layer and a second dielectric layer over the first dielectric layer, forming a waveguide core over the layer stack, and forming a coupler having a first plurality of grating structures and a transition structure over the layer stack. The transition structure includes a second plurality of grating structures that are positioned between the first plurality of grating structures and the waveguide core. The first plurality of grating structures include respective widths that vary as a function of position relative to the transition structure.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
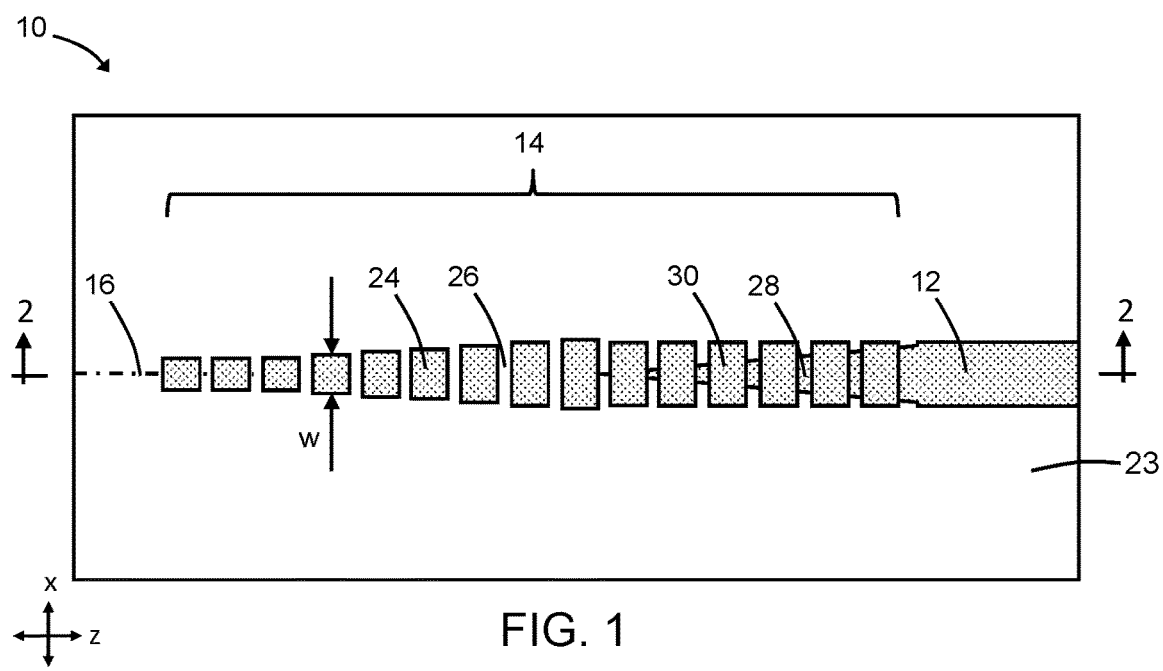
FIG. 1 is a top view of a photonics chip including a structure at an initial fabrication stage of a processing method in accordance with embodiments of the invention.
Figure 2:
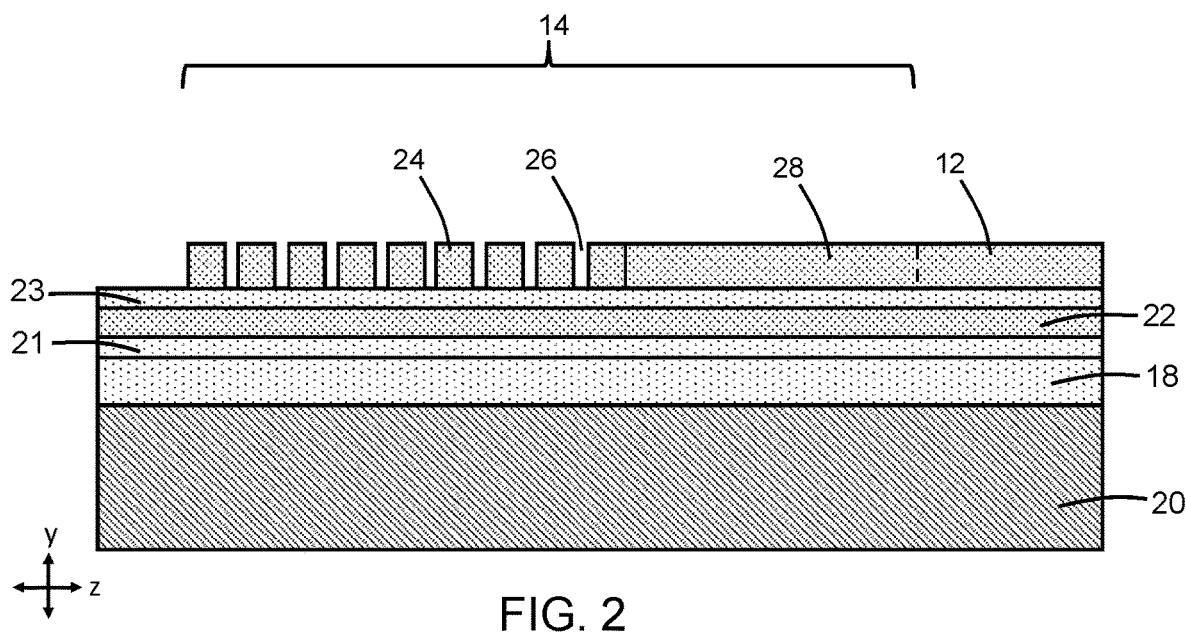
FIG. 2 is a cross-sectional view of the structure taken generally along line 2-2 in FIG. 1.

With reference to FIGS. 1, 2 and in accordance with embodiments of the invention, a structure 10 for an edge coupler includes a waveguide core 12 and a coupler 14 that are arranged adjacent to each other. The waveguide core 12 and coupler 14 may be aligned or substantially aligned along a longitudinal axis 16. The waveguide core 12 and coupler 14 may be formed over a buried insulator layer 18 of a silicon-on-insulator (SOI) wafer from which the device layer has been removed in the vicinity of the waveguide core 12 and coupler 14. The buried insulator layer 18 may be composed of a dielectric material, such as silicon dioxide, and the buried insulator layer 18 is arranged over a substrate 20 that may be composed of, for example, single-crystal silicon. Dielectric layers 21, 22, 23 may be located in a heterogeneous layer stack on the buried insulator layer 18, and the waveguide core 12 and coupler 14 may each be positioned directly on the dielectric layer 23. Dielectric layers 21 and 23 may be composed of, for example, silicon dioxide, and dielectric layer 22 may be composed of silicon nitride. The dielectric layer 21 may be in direct contact with the buried insulator layer 18.

The waveguide core 12 and coupler 14 may be concurrently formed by depositing a uniformly-thick layer of a material over the dielectric layer 23 and patterning the deposited layer with lithography and etching processes. To that end, an etch mask is formed by a lithography process over the deposited layer, and unmasked sections of the deposited layer are etched and removed with an etching process, such as reactive ion etching. The etching process may be selected to stop on the material of the dielectric layer 23 after penetrating fully through the deposited dielectric layer. Due to their concurrent formation from the same layer of material, the waveguide core 12 and coupler 14 may be coplanar with coplanar top and bottom surfaces, or the waveguide core 12 and coupler 14 may be substantially coplanar with substantially coplanar top and bottom surfaces.

In an embodiment, the waveguide core 12 and coupler 14 may be composed of a dielectric material, such as silicon nitride, that is deposited by chemical vapor deposition. In an alternative embodiment, the waveguide core 12 and coupler 14 may be composed of a dielectric material, such as silicon oxynitride or aluminum nitride, with a different composition than silicon nitride. In an alternative embodiment, the waveguide core 12 and coupler 14 may be composed of an organic material, such as a polymer.

The coupler 14 includes grating structures 24 that are separated by grooves 26 and a taper 28 that is overlaid with grating structures 30 to define a hybrid taper. The taper 28 and grating structures 30 are located between the grating structures 24 and the waveguide core 12, and the taper 28 and grating structures 30 provide a transition structure between the grating structures 24 and the waveguide core 12. The taper 28 may be adjoined to and continuous with the waveguide core 12, and the taper 28 may decrease in width with increasing distance from the waveguide core 12 such that the taper 28 has the form of an inverse taper.

The grating structures 24 may have a given periodicity along the longitudinal axis 16 defined by a pitch and a filling factor or duty cycle. The pitch represents a distance along the longitudinal axis 16 between adjacent pairs of the grating structures 24, and the duty cycle represents a fraction of the total area of the coupler 14 that is occupied by the grating structures 24 as opposed to grooves 26. The grating structures 30 also have a pitch that may be the same or different from the pitch of the grating structures 24, and the grating structures 30 also have a duty cycle that may be the same or different from the duty cycle of the grating structures 24. In the representative embodiment, the grating structures 24 are periodic with a single pitch and duty cycle, and the grating structures 30 are periodic with a single pitch and duty cycle. In the representative embodiment, the grating structures 24 are rectangular features with substantially planar sidewalls and a rectangular cross-section in a direction normal to the top surface of the dielectric layer 22. In an alternative embodiment, the grating structures 24 may be trapezoidal features with substantially planar sidewalls and a trapezoidal cross-section in a direction normal to the top surface of the dielectric layer 22. In an alternative embodiment, the grating structures 24 may be oval-shaped features each having a curved sidewall.

The grating structures 24 may have a width, w, that varies non-linearly with position relative to the waveguide core 12. For example, the width of the grating structures 24 may decrease in a non-linear manner with increasing distance from the taper 28 and waveguide core 12 such that the largest width occurs adjacent to the taper 28 and the smallest width occurs remote from the taper 28. The widths may be selected based on a non-linear function, such as tapered according to a quadratic, parabolic, exponential, or linear function, in order to provide the variation with position relative to the transition structure. In contrast to the widths of the grating structures 24, the widths of the grating structures 30 may be constant and not vary. The coupler 14 generally provides an array or matrix of structures on a two-dimensional surface with properties that differ from bulk properties, commonly referred to as a metamaterial.

Figure 3:
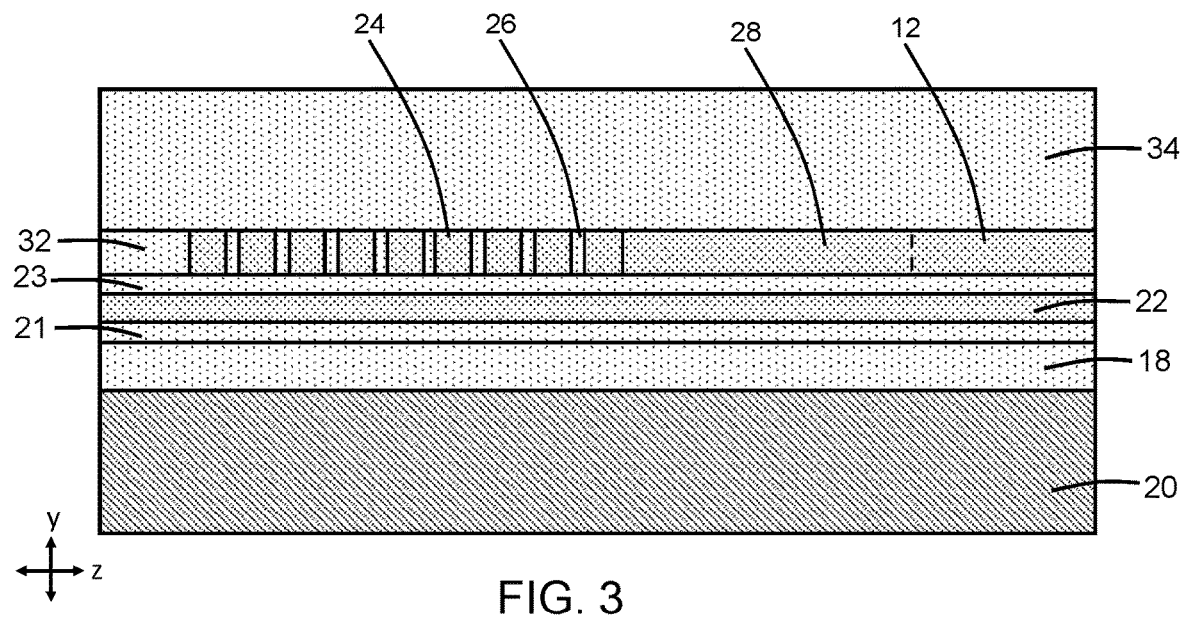
FIG. 3 is a cross-sectional view of the structure at a fabrication stage subsequent to FIG. 2.

With reference to FIG. 3 in which like reference numerals refer to like features in FIG. 2 and at a subsequent fabrication stage, an interconnect structure (not shown) may be formed by middle-of-line and back-end-of-line processing over the entire SOI wafer and removed from over the waveguide core 12 and coupler 14 with the exception of a residual dielectric layer 32. The interconnect structure may include metallization that is coupled with electronic components and active optical components that are integrated into a photonics chip. For example, the electronic components may include field-effect transistors that are fabricated by front-end-of-line processing.

The dielectric layer 32 of the interconnect structure fills the grooves 26 between the grating structures 24, the open space around the waveguide core 12 and coupler 14, and the open space between the grating structures 30 associated with the taper 28. In an embodiment, the dielectric layer 32 may be composed of an undoped silicate glass. A dielectric layer 34 is formed over the dielectric layer 32. The dielectric layer 34 may be composed of the same dielectric material, such as an undoped silicate glass, as the dielectric layer 32. In alternative embodiments, the dielectric layer 32 may be composed of a different material, such as silicon dioxide, a polymer, or air, that replaces the dielectric material (e.g., undoped silicate glass) originally deposited when the interconnect structure is formed.

Figure 4:
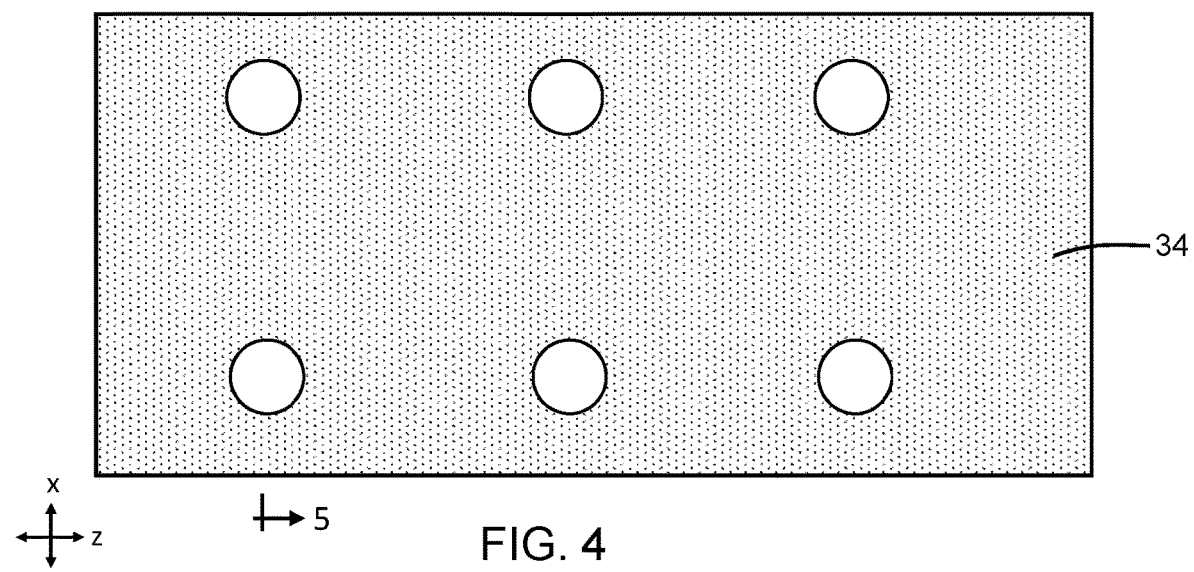
FIG. 4 is a top view of the structure at a fabrication stage subsequent to FIG. 3.
Figure 5:
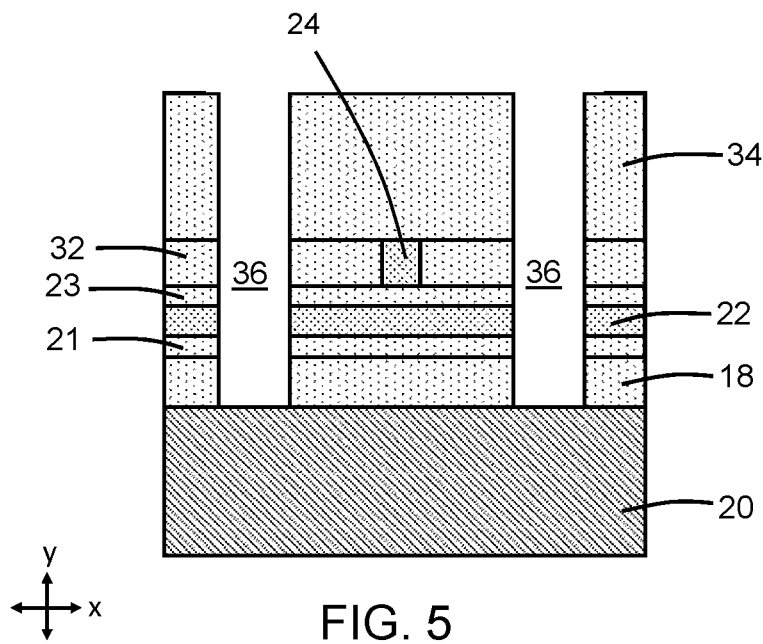
FIG. 5 is a cross-sectional view of the structure taken generally along line 5-5 in FIG. 4.

With reference to FIGS. 4, 5 in which like reference numerals refer to like features in FIG. 3 and at a subsequent fabrication stage, openings 36 are patterned with lithography and etching processes that extend through the dielectric layers 32, 34, the dielectric layers 21, 22, 23, and the buried insulator layer 18 to the substrate 20. The lithography process may entail forming an etch mask that includes a layer of a light-sensitive material, such as an organic photoresist, applied by a spin coating process, pre-baked, exposed to light projected through a photomask, baked after exposure, and developed with a chemical developer to form an opening over the intended locations for the openings 36. The etching process may be a reactive ion etching process, and the etch mask may be stripped by, for example, plasma ashing.

Figure 6:
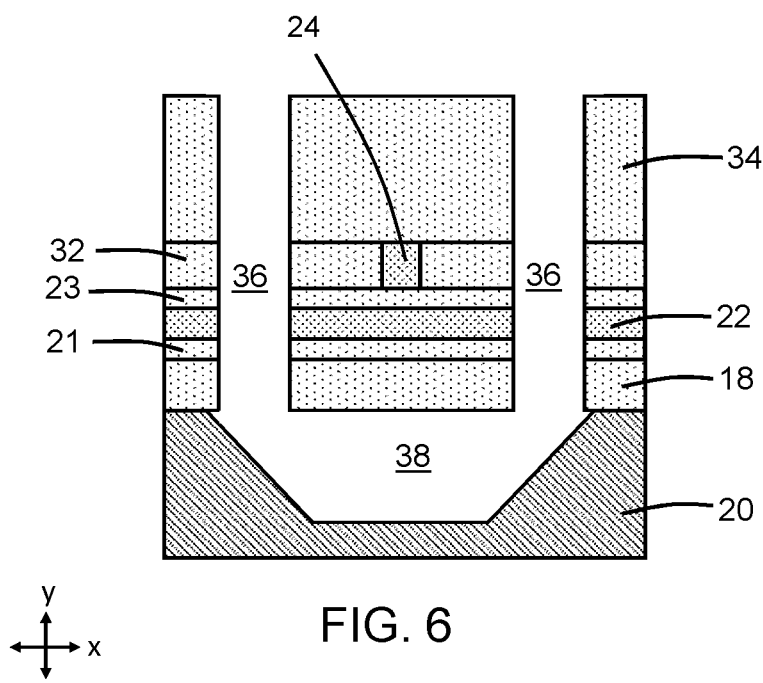
FIG. 6 is a cross-sectional view of the structure at a fabrication stage subsequent to FIG. 5.
Figure 7:
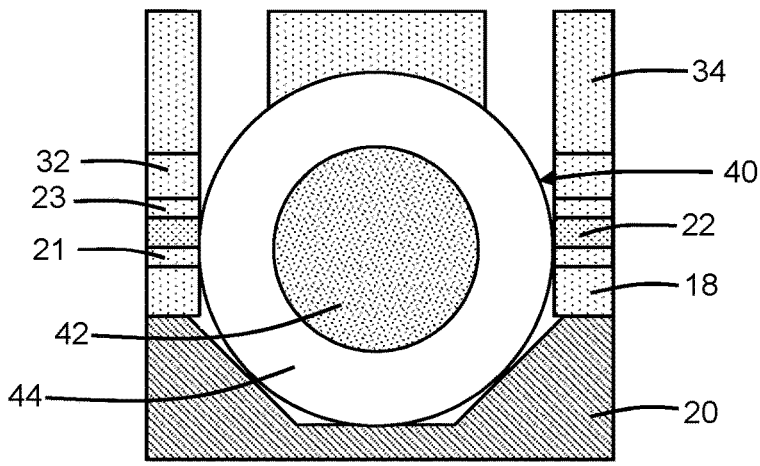
FIG. 7 is a diagrammatic view similar to FIG. 6 in which an optical fiber is inserted into the alignment groove of the structure.

With reference to FIGS. 6, 7 in which like reference numerals refer to like features in FIG. 5 and at a subsequent fabrication stage, a groove 38 is formed in the substrate 20. The groove 38 includes a portion that undercuts the buried insulator layer 18 and a portion on which an optical fiber 40 may be placed. The openings 36 provide access for etching the substrate 20 to define the groove 38. In the representative embodiment, the groove 38 may be formed by etching the substrate 20 with one or more etching processes, including dry etching processes and/or wet chemical etching processes. In the representative embodiment, the groove 38 has a V-shape. The groove 38 may have shapes of other geometries, such as a U-shape, that may be engineered through the selection of specific etching processes during its formation. The different portions of the groove 38 may also have different dimensions. For example, the portion on which the optical fiber is placed may be dimensionally larger than the portion that undercuts the buried insulator layer 18. The openings 36 provide access to the substrate 20 to perform the one or more etching process. The openings 36 may be filled with a material, such as an epoxy, as plugs following the formation of the groove 38.

As shown in FIG. 7, an optical fiber 40 may be positioned in the groove 38 adjacent to the waveguide core 12 and coupler 14. The optical fiber 40 may be aligned with the longitudinal axis 16 of the waveguide core 12 and coupler 14. The optical fiber 40 may include a core 42 surrounded by cladding 44. The coupler 14 may provide bidirectional in-plane optical coupling between the waveguide core 12 and the optical fiber 40 of different spot size. The optical coupling is established without a transition through any intervening structures formed from a semiconductor material, such as single-crystal silicon of the device layer of the SOI wafer. The coupler 14 is formed from a material with an index of refraction that is less than the index of refraction of silicon, which exhibits lower loss than a silicon-based coupler.

Figure 8:
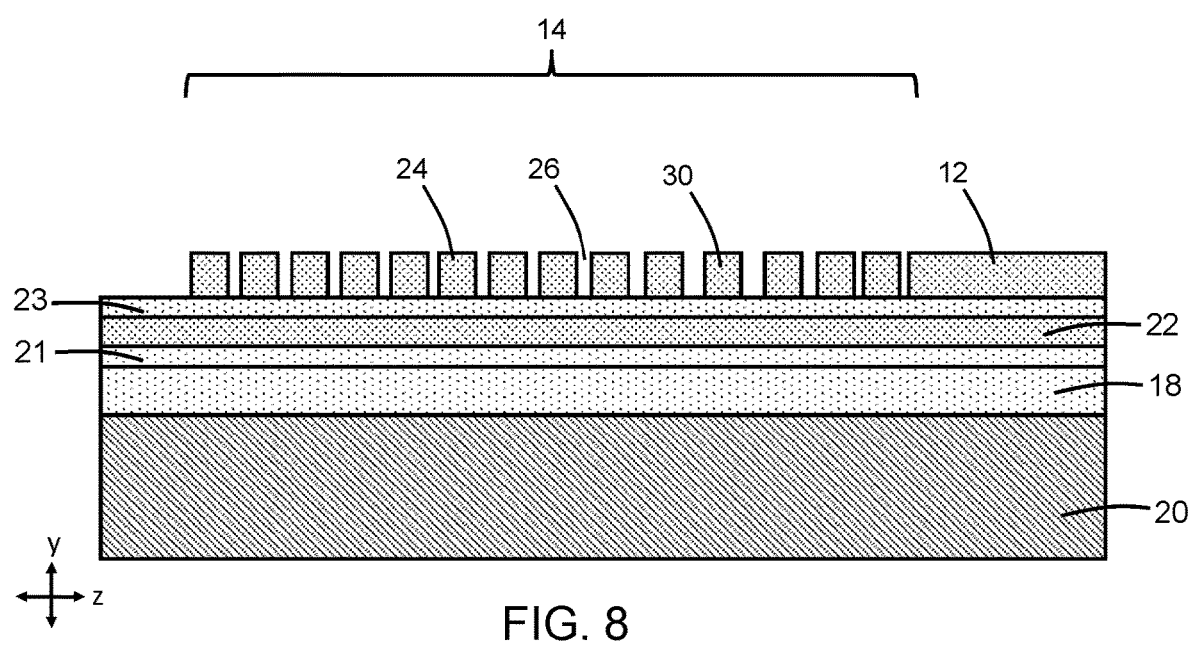
FIG. 8 is a cross-sectional view of a structure in accordance with alternative embodiments.

With reference to FIG. 8 in which like reference numerals refer to like features in FIG. 7 and in accordance with alternative embodiments of the invention, the taper 28 may be eliminated such that only grating structures 30 are located between the grating structures 24 and the waveguide core 12 as the transition structure. The grating structures 30 of the coupler 14 may be apodized (i.e., aperiodic) with a pitch and/or a duty cycle that varies along the longitudinal axis 16 as a function of position relative to the waveguide core 12 or the grating structures 24. Processing continues as described previously in connection with FIGS. 3-7.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a layer stack including a first dielectric layer and a second dielectric layer over the first dielectric layer;
a waveguide core over the layer stack; and
a coupler over the layer stack, the coupler including a first plurality of grating structures and a transition structure including a second plurality of grating structures that are positioned between the first plurality of grating structures and the waveguide core, and the first plurality of grating structures including respective widths that vary as a function of position relative to the transition structure.

2. The structure of claim 1, wherein the second plurality of grating structures have a periodic arrangement.

3. The structure of claim 2, wherein the transition structure further includes a taper that overlaps with the second plurality of grating structures.

4. The structure of claim 3, wherein the taper narrows in a direction from the waveguide core toward the first plurality of grating structures.

5. The structure of claim 1, wherein the transition structure further includes a taper that overlaps with the second plurality of grating structures.

6. The structure of claim 5, wherein the taper narrows in a direction from the waveguide core toward the first plurality of grating structures.

7. The structure of claim 1, wherein the respective widths of the first plurality of grating structures vary non-linearly with position relative to the transition structure based on a non-linear function.

8. The structure of claim 1, wherein the respective widths of the first plurality of grating structures decrease non-linearly in width with increasing distance from the transition structure.

9. The structure of claim 1, wherein the second plurality of grating structures have a pitch or a duty cycle that varies as a function of position relative to the waveguide core.

10. The structure of claim 1, wherein the layer stack is located over a buried insulator layer of a silicon-on-insulator wafer, and a device layer of the silicon-on-insulator wafer is removed such that the layer stack is in direct contact with the buried insulator layer.

11. The structure of claim 10, wherein a substrate of the silicon-on-insulator wafer includes a groove that is configured to hold an optical fiber adjacent to the coupler.

12. The structure of claim 11, wherein the coupler and the waveguide core are aligned along a longitudinal axis, and the groove is configured to hold the optical fiber in alignment with the longitudinal axis.

13. The structure of claim 11, further comprising:
a third dielectric layer over the layer stack,
wherein the third dielectric layer surrounds the waveguide core and the coupler, and an opening extends through the third dielectric layer, the layer stack, and the buried insulator layer to the groove in the substrate.

14. The structure of claim 1, wherein the waveguide core and the coupler are substantially coplanar.

15. The structure of claim 1, wherein the waveguide core and the coupler are comprised of a dielectric material.

16. The structure of claim 1, wherein the waveguide core and the coupler are comprised of silicon nitride.

17. The structure of claim 1, wherein the waveguide core and the coupler are aligned along a longitudinal axis.

18. A method comprising:
forming a layer stack that includes a first dielectric layer and a second dielectric layer over the first dielectric layer;
forming a waveguide core over the layer stack; and
forming a coupler including a first plurality of grating structures and a transition structure over the layer stack, wherein the transition structure includes a second plurality of grating structures that are positioned between the first plurality of grating structures and the waveguide core, and the first plurality of grating structures including respective widths that vary as a function of position relative to the transition structure.

19. The method of claim 18, wherein forming the coupler including the first plurality of grating structures and the transition structure over the layer stack further comprises:
 forming a taper that overlaps with the second plurality of grating structures,
 wherein the taper narrows in a direction from the waveguide core toward the first plurality of grating structures, and the respective widths of the first plurality of grating structures vary non-linearly with position relative to the transition structure based on a non-linear function.

20. The method of claim 18, wherein the second plurality of grating structures have a pitch or a duty cycle that varies as a function of position relative to the waveguide core.

\* \* \* \* \*